United States Patent
Grip et al.

(10) Patent No.: US 8,243,237 B2
(45) Date of Patent: Aug. 14, 2012

(54) TRANSMISSIVE AND TRANSFLECTIVE DEVICE DISPLAY

(75) Inventors: Martin Grip, Furulund (SE); Alexander Hunt, Malmo (SE)

(73) Assignee: Sony Mobile Communications AB, Lund (CH)

(*) Notice: Subject to any disclaimer, the term of this patent is extended or adjusted under 35 U.S.C. 154(b) by 792 days.

(21) Appl. No.: 11/557,216

(22) Filed: Nov. 7, 2006

(65) Prior Publication Data

US 2008/0123033 A1    May 29, 2008

(51) Int. Cl.
*G02F 1/1335* (2006.01)

(52) U.S. Cl. .......................... 349/114; 349/95

(58) Field of Classification Search .......... 349/95, 349/114
See application file for complete search history.

(56) References Cited

U.S. PATENT DOCUMENTS

| | | | |
|---|---|---|---|
| 6,195,140 B1* | 2/2001 | Kubo et al. | 349/44 |
| 6,680,761 B1* | 1/2004 | Greene et al. | 349/73 |
| 7,034,908 B2* | 4/2006 | Liu | 349/95 |
| 7,518,679 B2 | 4/2009 | Lijima | |
| 7,649,596 B2* | 1/2010 | Rho | 349/114 |
| 2004/0257496 A1* | 12/2004 | Sonoda et al. | 349/95 |
| 2005/0041177 A1* | 2/2005 | Watanabe | 349/64 |
| 2005/0105024 A1 | 5/2005 | Suzuki et al. | |
| 2005/0122452 A1* | 6/2005 | Yoshida et al. | 349/114 |
| 2005/0134769 A1* | 6/2005 | Mi | 349/114 |
| 2006/0125983 A1 | 6/2006 | Hu et al. | |
| 2007/0216827 A1* | 9/2007 | Okada et al. | 349/62 |

FOREIGN PATENT DOCUMENTS

| | | |
|---|---|---|
| JP | 2000298267 A | 10/2000 |
| JP | 2003-255318 | 9/2003 |
| JP | 2004-070225 | 3/2004 |
| JP | 2005-173565 | 6/2005 |
| JP | 2006189499 A | 7/2006 |
| KR | 2002-0051858 | 6/2002 |
| KR | 2004-0084485 | 10/2004 |

OTHER PUBLICATIONS

Written Opinion and International Search Report for corresponding PCT application with a mailing date of Sep. 25, 2007; 14 pages.
International Preliminary Report on Patentability for corresponding PCT application No. PCT/IB2007/051709, with a mailing date of Jan. 27, 2009, 7 pages.
State Intellectual Property Office, P.R. China; Third Office Action; Sep. 7, 2011; issued in Chinese Patent Application No. 200780049348.8.
Japanese Patent Office; First Office Action; Nov. 18, 2011; issued in Japanese Patent Application No. 2009-535154.

* cited by examiner

*Primary Examiner* — Mark Robinson
*Assistant Examiner* — Charles Chang
(74) *Attorney, Agent, or Firm* — Sreenivas Vedantam; Moore & Van Allen (57) ABSTRACT

A device includes a display that includes a transmissive portion, a transflective portion, and a lens array associated with the transflective portion.

18 Claims, 8 Drawing Sheets

TRANSMISSIVE AND TRANSFLECTIVE DEVICE DISPLAY

BACKGROUND

1. Field of the Invention

Implementations described herein relate generally to devices and, more particularly, to a transmissive and transflective display for devices.

2. Description of Related Art

More and more main displays for devices (e.g., mobile communication devices) are transmissive displays because such displays provide enhanced performance in many areas compared to transflective displays or purely reflective displays. A transmissive display is illuminated from the back by an illumination device/light source (e.g., a backlight), and is viewed from the opposite side (i.e., the front). This type of display may be used in applications requiring high luminance levels (e.g., computer displays, televisions, personal digital assistants (PDAs), mobile phones, etc.). Unfortunately, the illumination device used to illuminate a transmissive display usually consumes much more power than the display.

One solution to this problem is to make the display reflective or transflective. A reflective display (e.g., often found in digital watches or calculators) is illuminated by external light reflected by a diffusing reflector located behind the display. Although the absence of an illumination device reduces power consumption in a reflective display, the contrast on such displays is typically poorer than on transmissive displays. A transflective display works as either a transmissive display or a reflective display, depending on the ambient light. For example, a transflective display operates in a reflective mode when external light levels are high, and in a transmissive mode in darker environments via a backlight. Unfortunately, transflective displays fail to provide a good transmissive mode or a good reflective mode when it comes to utilization of the pixel area as compared to pure transmissive displays and pure reflective displays.

SUMMARY

According to one aspect, a device may include a display that may include a transmissive portion, a transflective portion, and a lens array associated with the transflective portion.

Additionally, the display may further include an illumination device configured to provide light to the transmissive portion and the transflective portion.

Additionally, the transmissive portion and the transflective portion may be illuminated when the illumination device is energized.

Additionally, the lens array may be provided between the illumination device and the transflective portion.

Additionally, ambient light illuminates the transflective portion when the illumination device is de-energized.

Additionally, the transflective portion may display visual information on the display.

Additionally, the transflective portion may include a transmissive section and a reflective section.

Additionally, the lens array may include at least one of glass, quartz, sapphire, or polymeric materials.

Additionally, the lens array may include a micro lens array.

Additionally, the display may include one of a monochrome or a color display.

According to another aspect, a device display may include a pixel array that may include a transmissive portion and a transflective portion, an illumination device that may be capable of illuminating the pixel array, and a lens array associated with the transflective portion of the pixel array.

Additionally, the pixel array may include a liquid crystal display (LCD).

Additionally, the pixel array may include one of a passive-matrix structure or an active-matrix structure.

Additionally, a pixel of the transflective portion may include a first subpixel that may include a first reflective section and a first transmissive section, a second subpixel that may include a second reflective section and a second transmissive section, and a third subpixel that may include a third reflective section and a third transmissive section.

Additionally, the pixel of the transflective portion may further include a first thin film transistor (TFT) associated with the first subpixel, a second TFT associated with the second subpixel, and a third TFT associated with the third subpixel.

Additionally, the pixel of the transflective portion may be associated with a row line and at least one corresponding gate line via the first, second, and third TFTs.

Additionally, the lens array may include a plurality of lenslets, each lenslet being associated with a subpixel of the pixel of the transflective portion.

Additionally, the illumination device may include one of an incandescent light bulb, one or more light-emitting diodes (LEDs), an electroluminescent panel (ELP), one or more cold cathode fluorescent lamps (CCFL), or one or more hot cathode fluorescent lamps (HCFL).

Additionally, the transmissive portion and the transflective portion of the pixel array may provide substantially the same illumination, contrast, and color when the illumination device is energized and illuminates the pixel array.

Additionally, ambient light may be reflected by the transflective portion when the illumination device is de-energized.

According to yet another aspect, a method may include providing a transmissive portion for a device display, providing a transflective portion for a device display, and associating a lens array with the transflective portion of the device display.

Additionally, the method may further include providing an illumination device that may be capable of illuminating the transmissive and transflective portions of the device display.

According to still another aspect, a system may include means for displaying information that may include a transmissive portion and a transflective portion, means configured for illuminating the display means, and means for collecting and guiding the light from the illumination means to a transmissive section of the transflective portion of the display means.

BRIEF DESCRIPTION OF THE DRAWINGS

The accompanying drawings, which are incorporated in and constitute a part of this specification, illustrate exemplary embodiments, and, together with the description, explain the exemplary embodiments. In the drawings.

DETAILED DESCRIPTION

The following detailed description refers to the accompanying drawings. The same reference numbers in different drawings may identify the same or similar elements. Also, the following detailed description does not limit the invention.

Implementations described herein may relate to a transmissive and transflective display for use in conjunction with a device. By using a transmissive/transflective display and a lens array (e.g., a micro lens array) associated with the transflective portion, the performance of the display may substantially match the performance of a pure transmissive display when an illumination device (e.g., a backlight) is turned on, while still providing a reflective portion (i.e., a reflective section of the transflective portion) that can be used when the illumination device is turned off. The lens array may collect and guide the light from the illumination device to a transmissive section of the transflective portion when the illumination device is energized. Ambient light may reflect from a reflective section of the transflective portion when the illumination device is de-energized or turned off. This may enable the transflective portion of the display to display information when the device is in a standby mode (i.e., when the illumination device is turned off). For example, in one implementation, the display may include a transflective portion that displays, e.g., a clock, during a standby mode of the device. Such an arrangement may enable the device to display the clock without consuming battery power (e.g., by the illumination device). In other implementations, the display may include several transflective portions (e.g., of varying shapes, sizes, locations, etc.) that may display various standby information (e.g., a clock, battery life, connection to a network, etc.), without consuming battery power with the illumination device.

The description to follow will describe a device. As used herein, a "device" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, a Doppler receiver, and/or global positioning system (GPS) receiver; a laptop; a GPS device; a personal computer; an MP3 player; a printer; a facsimile machine; a pager; a calculator; a camera (e.g., digital or video); and/or any other device capable of utilizing a display.

Exemplary Device Displays

Figure 1:
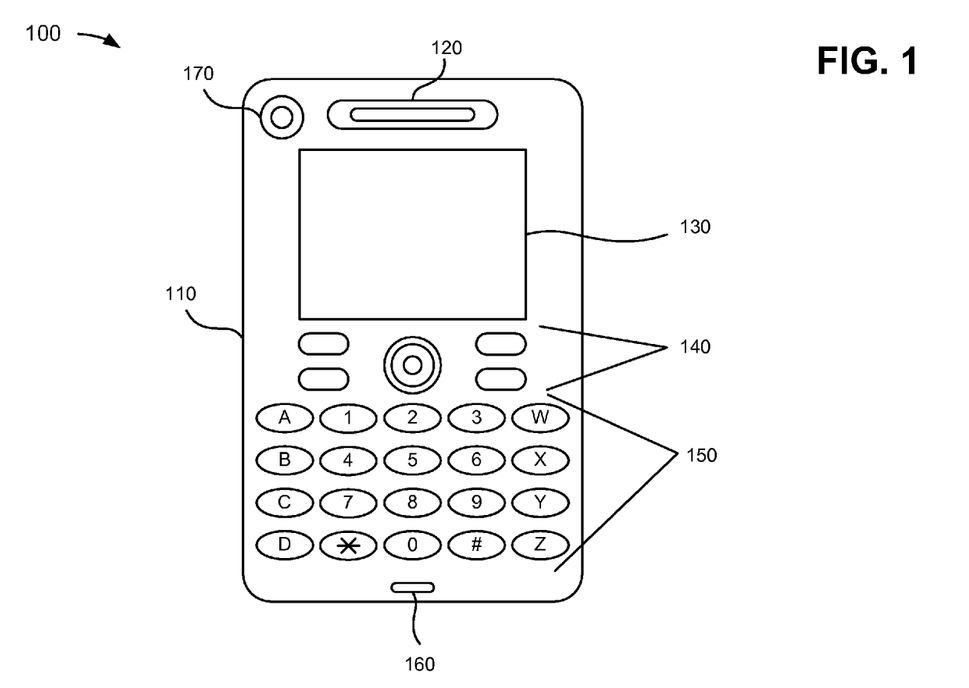
FIG. 1 is a diagram of an exemplary device in which systems and methods described herein may be implemented.

FIG. 1 is a diagram of an exemplary device 100 according to an implementation described herein. As shown in FIG. 1, device 100 may include a housing 110, a speaker 120, a display 130, control buttons 140, a keypad 150, a microphone 160, and/or a camera 170. Housing 110 may protect the components of device 100 from outside elements. Speaker 120 may provide audible information to a user of device 100. Display 130 may provide visual information to the user. For example, display 130 may provide information regarding incoming or outgoing calls, games, phone books, the current time, emails, etc. Control buttons 140 may permit the user to interact with device 100 to cause device 100 to perform one or more operations. Keypad 150 may include a standard telephone keypad and/or/or may include additional keys to enable typing information into device 100. Microphone 160 may receive audible information from the user. Camera 170 may enable a user to capture and/or store video and/or images (e.g., pictures).

First Exemplary Device Display

Figure 2A:
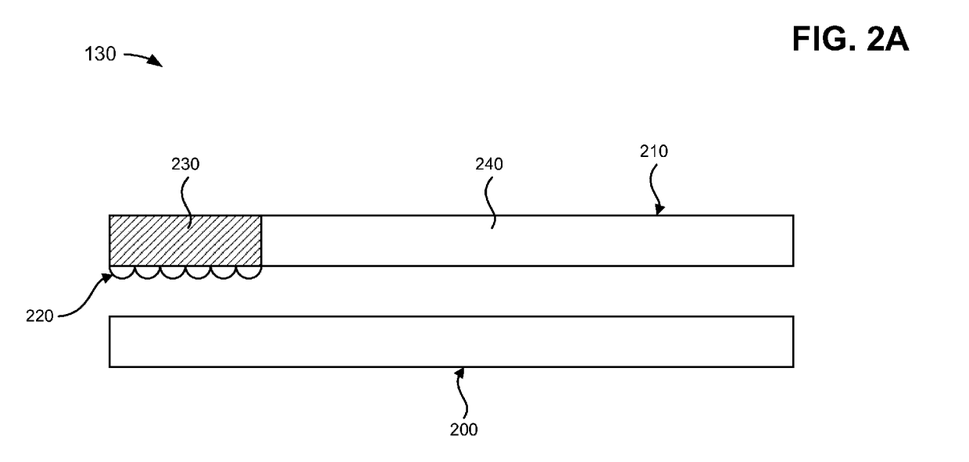
FIG. 2A is a partial side elevation view, in partial cross section, of a display of the exemplary device shown in FIG. 1.

FIG. 2A is a partial side elevation view, in partial cross section, of display 130. As shown in FIG. 2A, display 130 may include an illumination device 200, a pixel array 210 that includes a transflective portion 230 and a transmissive portion 240, and a lens array 220. Display 130 may include other components (e.g., electrical components, optical components, etc.) not shown in FIG. 2A.

Illumination device 200 may include any device capable of providing illumination or lighting to pixel array 210. For example, illumination device 200 may include an incandescent light bulb, one or more light-emitting diodes (LEDs), an electroluminescent panel (ELP), one or more cold cathode fluorescent lamps (CCFL), one or more hot cathode fluorescent lamps (HCFL), etc. An incandescent light bulb may be used when very high brightness is desired. LEDs may be used in small, inexpensive displays, and may include colored or white light. An ELP may be used for larger displays or when even lighting is desired, and may be either colored or white. CCFLs may be used on large displays (e.g., computer monitors) and may be white in color. In another example, illumination device 200 may employ a diffuser or light guide to provide even lighting from an uneven source. In still another example, illumination device 200 can include any color light source (e.g., yellow, green, blue, white, etc.) or any combination of colored/non-colored light sources.

Pixel array 210 may include any device capable of providing visual information (e.g., text, images, video, incoming or outgoing calls, games, phone books, the current time, emails, etc.) to a user. For example, pixel array 210 may include a liquid crystal display (LCD), such as a thin film transistor (TFT) LCD display, or a high performance addressing (HPA) LCD display.

In one implementation, pixel array 210 may include any number of color and/or monochrome pixels arrayed in front of a light source (e.g., illumination device 200). In another implementation, pixel array 210 may include electrodes on one side of pixel array 210 that may be grouped and wired together with gate or column lines, and each group may receive its own voltage source. Pixel array 210 may further include electrodes on another side of pixel array 210 that may be grouped and wired together with row lines, and each group may receive its own voltage sink. The groups may be designated so that each pixel of pixel array 210 may have a unique combination of source and sink.

In still another implementation, pixel array 210 may include a passive-matrix structure or an active-matrix structure. In a passive-matrix structure, each row or column of pixel array 210 may include a single electrical circuit, and the pixels may be addressable one at a time by row and column addresses. Pixels may maintain their states between refreshes without the benefit of an electrical charge. In an active-matrix structure, a matrix of TFTs may be added to the polarizing and color filters, and each pixel may include its own dedicated TFT that allows each gate or column line to access one pixel. If a row line is activated, the gate lines may be connected to a row of pixels and a correct voltage may be driven onto all of the gate lines. The row line may be deactivated, and the next row line may be activated. All row lines may be activated in sequence during a refresh operation.

In a further implementation, if pixel array 210 is a color array, each pixel may be divided into three cells, or subpixels, which may be colored red, green, and blue by additional filters (e.g., pigment filters, dye filters, metal oxide filters, etc.). Each subpixel may be controlled independently to yield thousands or millions of possible colors for each pixel. In other implementations, each pixel of pixel array 210 may include more or less than three subpixels of various colors other than red, green, and blue.

Figure 2B:
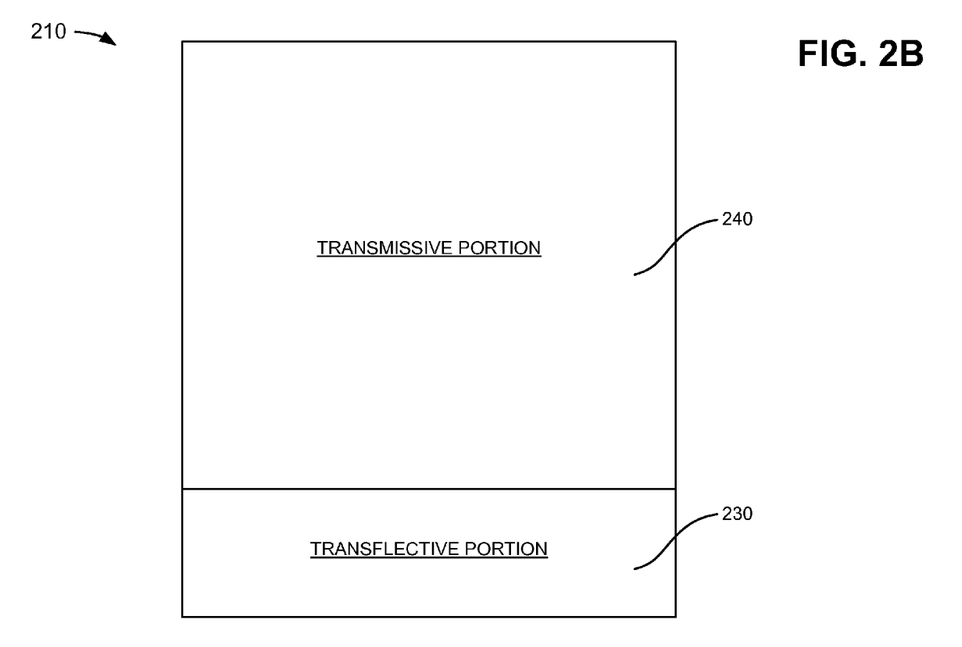
FIG. 2B shows a front view of a pixel array of the display shown in FIGS. 1 and 2A, and further shows an implementation of the pixel array.

As shown in FIGS. 2A and 2B, pixel array 210 may include transflective portion 230 and transmissive portion 240. Each pixel or subpixel of transflective portion 230 may include a transmissive section and a reflective section that permits transflective portion 230 to work as either a transmissive display or a reflective display, respectively. For example, transflective portion 230 may work reflectively when illumination device 200 is de-energized or turned off, and may work transmissively when illumination device 200 is energized or turned on. Transmissive portion 240 may include any material that may be illuminated from the back by an illumination device (e.g., illumination device 200), and is viewed from the opposite side (i.e., the front).

Transflective portion 230 and transmissive portion 240 may have a variety of shapes and/or sizes depending upon the shape and/or size of device 100 and/or display 130. For example, in the implementation shown in FIGS. 2A and 2B, transmissive portion 240 may encompass a larger area (e.g., seventy-five percent of the area of pixel array 210) of pixel array 210, than an area (e.g., twenty-fiver percent of the area of pixel array 210) encompassed by transflective portion 230. Such an arrangement may permit power conservation for a power supply (not shown) of device 100 by de-energizing illumination device 200 (e.g., a standby mode), and may permit information to be displayed by transflective portion 230 during the standby mode. In other implementations (e.g., as described below in connection with FIGS. 3A and 3B), more than one transflective portion 230 of varying shapes and/or sizes may be provided for pixel array 210, and may be arranged at various locations of pixel array 210 depending upon the desired amount and/or location(s) of the information to be displayed during the standby mode.

As further shown in FIG. 2A, lens array 220 may be associated with transflective portion 230 of pixel array 210. Lens array 220 may be made from a variety of materials. For example, lens array 200 may be fabricated from any transparent material, e.g., glass, quartz, sapphire, polymeric materials including plastics, etc. Examples of polymeric materials may include polymethylmethacrylates, polyvinylcarbazoles, polybutadienes, polyethylenes (e.g., polyethylene terephthalate), polyesters, etc.

Lens array 220 may be a variety of shapes and/or sizes. For example, in one implementation, lens array 220 may be a micro lens array formed from any of the foregoing materials. In another implementation, lens array 220 can be formed from a polymer laminate fabricated from any of the aforementioned polymeric materials. In still another implementation, lens array 220 may be sized and shaped to substantially the same size and shape of transflective portion 230.

If illumination device 200 is energized, lens array 220 may collect the light from illumination device 200 and guide it to a transmissive section of the transflective portion 230. If illumination device 200 is de-energized or turned off, ambient light may reflect from the reflective section of transflective portion 230 and the reflective section may display information during the standby mode. This may enable device 130 to display information with transflective portion 230, without consuming power with illumination device 200 (which is turned off). For example, ambient light may permit the reflective section of transflective portion 230 to show a standby clock (e.g., in the lower part of display 130), without using illumination device 200. Lens array 220 and the relation between the transmissive and reflective sections of transflective portion 230 may be designed such that transflective portion 230 may substantially match the luminance, color, and/or contrast of transmissive portion 240 (e.g., when illumination device 200 is energized).

Second Exemplary Device Display

Figure 3A:
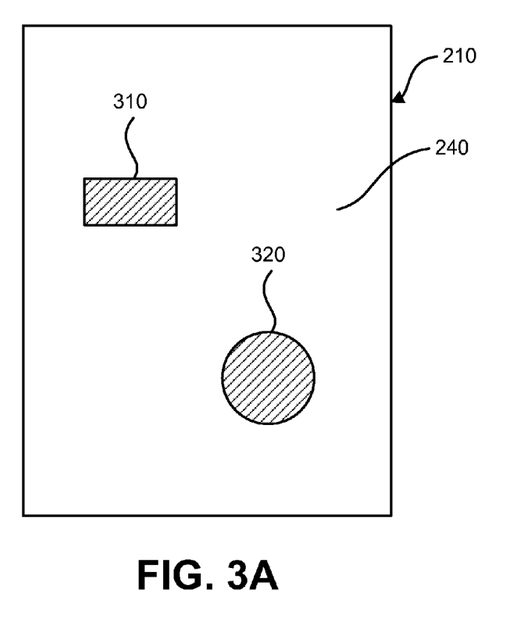
FIG. 3A is front view of another implementation of the pixel array shown in FIGS. 1, 2A, and 2B.
Figure 3B:
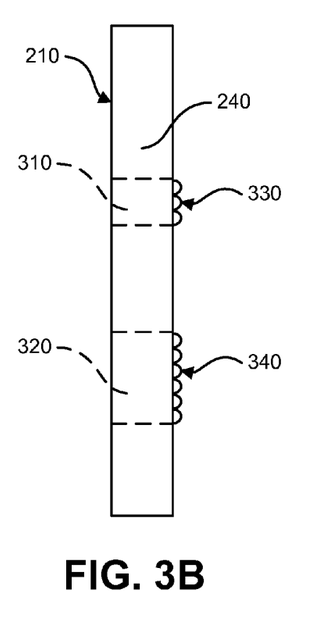
FIG. 3B is a side elevation view of the pixel array shown in FIG. 3A.

FIGS. 3A and 3B are a front view and a side elevation view, respectively, of another implementation of pixel array 210. As shown in FIG. 3A, pixel array 210 may include transmissive portion 240 and one or more transflective portions 310 and 320 of various shapes (e.g., square, rectangular, circular, triangular, etc.), sizes, and/or locations. Transflective portions 310 and 320 may include the same features as described above for transflective portion 230. Any number of transflective portions may be provided for pixel array 210, depending upon the desired information to be display by pixel array 210 when illumination device 200 is de-energized. As shown in FIG. 3B, transflective portion 310 may have a lens array 330 associated with it, and transflective portion 320 may have a lens array 340 associated with it. Lens arrays 330 and 340 may include the same features as described above for lens array 220. Lens arrays 330 and 340 may collect and guide light (e.g., from illumination device 200) to transmissive sections of corresponding transflective portions 310 and 320 so that the transmissive sections of transflective portions 310 and 320 may display information with the same luminance, color, and/or contrast as transmissive portion 240. Transflective portions 310 and 320 may also display information during the standby mode (i.e., when illumination device 200 is turned off) due to the reflection of ambient light from the reflective sections of transflective portions 310 and 320.

Exemplary Pixel of First and Second Exemplary Device Displays

Figure 4A:
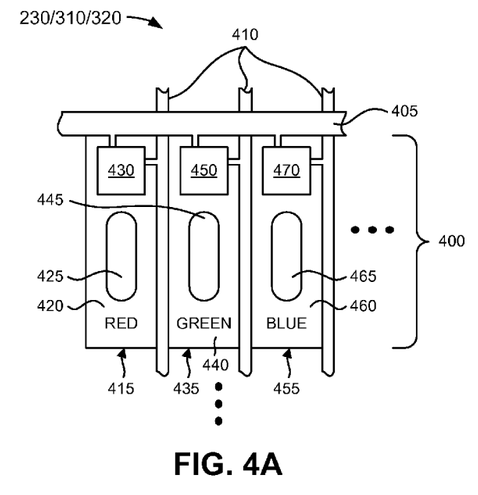
FIG. 4A is a partial side elevation view of an exemplary pixel of a transflective portion of the pixel array shown in FIGS. 1-3B.

FIG. 4A is a partial side elevation view of an exemplary pixel 400 of transflective portions 230, 310, or 320. Although FIG. 4A shows a color pixel 400, in other implementations, transflective portions 230, 310, or 320 may include monochrome pixels. As shown, pixel 400 may include a red subpixel 415, a green subpixel 435, and a blue subpixel 455, which may be associated with a row line 405 and gate lines 410.

As further shown in FIG. 4A, red subpixel 415 may be associated with a reflective section 420, a transmissive section 425, and a TFT 430. Ambient light may be reflected by reflective section 420 in the standby mode. Reflective section 420 may use a color filter (e.g., red) to create color. Ambient light may pass through reflective section 420 and through the color filter, may be reflected by reflective section 420 (and pass through the color filter again), and may be viewed as red subpixel 415. Transmissive section 425 may include any material that may be illuminated from the back (e.g., with illumination device 200), and is viewed from the opposite side (i.e., the front). Transmissive section 425 may also use the color filter (e.g., red) to create color. Light from illumination device 200 may be transmitted through transmissive section 425 and the color filter, and may be viewed as red subpixel 415. TFT 430 may be electrically coupled to row line 405 and to a corresponding one of gate lines 410. TFT 430 may permit row line 405 and/or the corresponding one of gate lines 410 to access red subpixel 415.

Green subpixel 435 may be associated with a reflective section 440, a transmissive section 445, and a TFT 450. Ambient light may be reflected by reflective section 440 in the standby mode. Reflective section 440 may use a color filter (e.g., green) to create color. Ambient light may pass through reflective section 440 and through the color filter, may be reflected by reflective section 440 (and pass through the color filter again), and may be viewed as green subpixel 435. Transmissive section 445 may include any material that may be illuminated from the back (e.g., with illumination device 200), and is viewed from the opposite side (i.e., the front). Transmissive section 445 may also use the color filter (e.g., green) to create color. Light from illumination device 200 may be transmitted through transmissive section 445 and the color filter, and may be viewed as green subpixel 435. TFT 450 may be electrically coupled to row line 405 and to a corresponding one of gate lines 410. TFT 450 may permit row line 405 and/or the corresponding one of gate lines 410 to access green subpixel 435.

As further shown in FIG. 4A, blue subpixel 455 may be associated with a reflective section 460, a transmissive section 465, and a TFT 470. Ambient light may be reflected by reflective section 460 in the standby mode. Reflective section 460 may use a color filter (e.g., blue) to create color. Ambient light may pass through reflective section 460 and through the color filter, may be reflected by reflective section 460 (and pass through the color filter again), and may be viewed as blue subpixel 455. Transmissive section 465 may include any material that may be illuminated from the back (e.g., with illumination device 200), and is viewed from the opposite side (i.e., the front). Transmissive section 465 may also use the color filter (e.g., blue) to create color. Light from illumination device 200 may be transmitted through transmissive section 465 and the color filter, and may be viewed as blue subpixel 455. TFT 470 may be electrically coupled to row line 405 and to a corresponding one of gate lines 410. TFT 470 may permit row line 405 and/or the corresponding one of gate lines 410 to access blue subpixel 455.

Figure 4B:
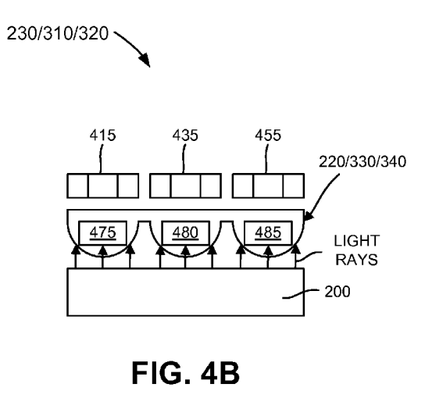
FIG. 4B shows a partial side elevation view of the pixel shown in FIG. 4A, and further shows a lens array of the display shown in FIGS. 2A and 3B and an illumination device of the display shown in FIG. 2A.

FIG. 4B shows a partial side elevation view of pixel 400, and further shows a lens array (e.g., lens array 220, 330, or 340), and an illumination device (e.g., illumination device 200). As shown, a lenslet of lens array 220, 330, or 340 may collect and guide light 475 from illumination device 200. Light 475 may be provided to transmissive section 425 of red subpixel 415, and transmissive section 425 may use light 475 to display information during a normal mode (i.e., when illumination device 200 is energized). Another lenslet of lens array 220, 330, or 340 may collect and guide light 480 from illumination device 200. Light 480 may be provided to transmissive section 445 of green subpixel 435, and transmissive section 445 may use light 480 to display information during the normal mode. Still another lenslet of lens array 220, 330, or 340 may collect and guide light 485 from illumination device 200. Light 485 may be provided to transmissive section 465 of blue subpixel 455, and transmissive section 465 may use light 485 to display information during the normal mode. In one implementation, the combination of light 475, 480, and 485 may be used to display color information during the normal mode.

Exemplary Operation of the First and Second Exemplary Displays

Figure 5A:
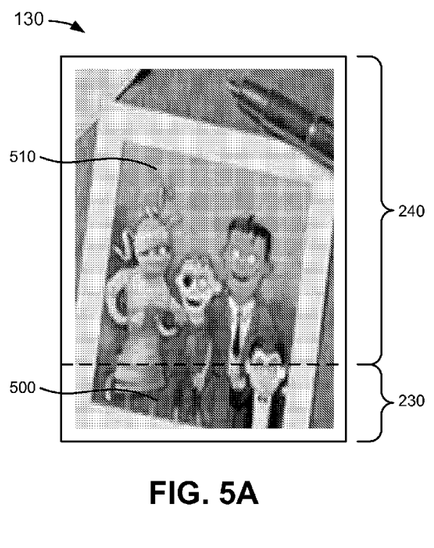
FIGS. 5A and 5B are front views of the display shown in FIGS. 1, 2A, and 2B, where the display is in a transmissive mode in FIG. 5A and in a reflective mode in FIG. 5B, according to an exemplary implementation.
Figure 5B:
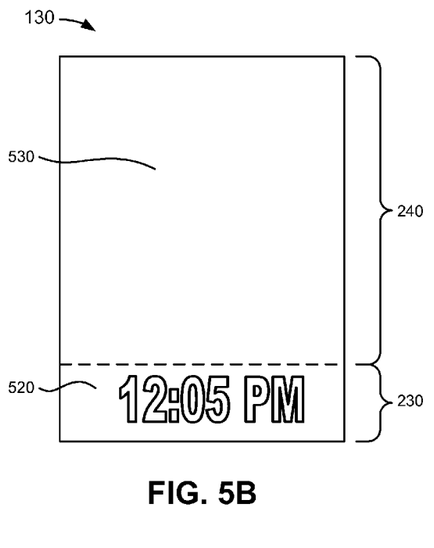

FIGS. 5A and 5B are front views of display 130 shown in FIGS. 1, 2A, and 2B, according to an exemplary implementation. Display 130 may include transflective portion 230 that displays a portion 500 of an image, and transmissive portion 240 that displays a remaining portion 510 of the image. Display 130 may be in a transmissive or normal mode in FIG. 5A (i.e., illumination device 200 may be energized), and may display portions 500 and 510 of the image continuously and with substantially the same illumination, contrast, and/or color with both transflective portion 230 and transmissive portion 240 due to the illumination boost provided by lens array 220 to transflective portion 230. Display 130 may be in a reflective or standby mode in FIG. 5B (i.e., illumination device 200 may be de-energized or turned off), may not display information with transmissive portion 240 (as shown by reference number 530), but may display information 520 (e.g., a clock) with transflective portion 230. For example, the reflective section of transflective portion 230 may reflect ambient light and thereby display information 520, such as the current time.

Figure 6A:
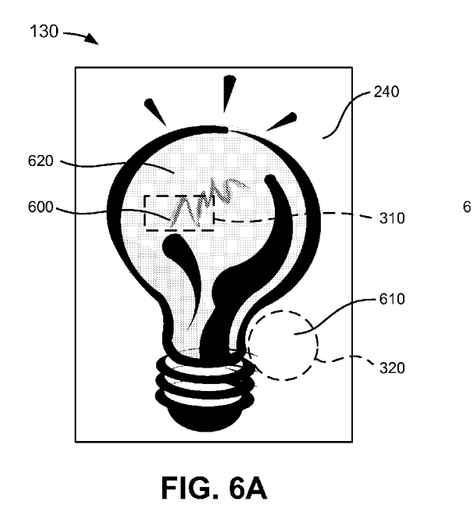
FIGS. 6A and 6B are front views of the display shown in FIGS. 1, 3A, and 3B, where the display is in a transmissive mode in FIG. 6A and in a reflective mode in FIG. 6B, according to an exemplary implementation.
Figure 6B:
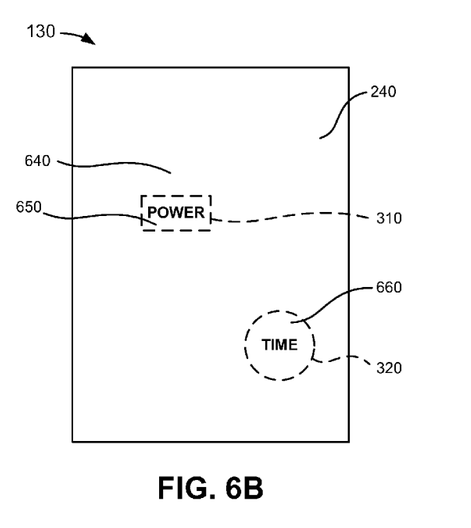

FIGS. 6A and 6B are front views of display 130 shown in FIGS. 1, 3A, and 3B, according to an exemplary implementation. Display 130 may include transflective portions 310 and 320 that display portions 600 and 610 of an image, and transmissive portion 240 that displays a remaining portion 620 of the image (i.e., the portion of the image outside of portions 600 and 610). Display 130 may be in a transmissive or normal mode in FIG. 6A (i.e., illumination device 200 may be energized), and may display portions 600-620 of the image continuously and with substantially the same illumination, contrast, and/or color with transflective portions 310 and 320 and transmissive portion 240 due to the illumination provided by lens arrays 330 and 340 to transflective portions 310 and 320. Display 130 may be in a reflective or standby mode in FIG. 6B (i.e., illumination device 200 may be de-energized or turned off), may not display information with transmissive portion 240 (as shown by reference number 640), but may display information 650 (e.g., a power indicator) and information 660 (e.g., the time) with transflective portions 310 and 320. For example, the reflective sections of transflective portions 310 and 320 may reflect ambient light and thereby display information 650 and 660.

Exemplary Process

Figure 7:
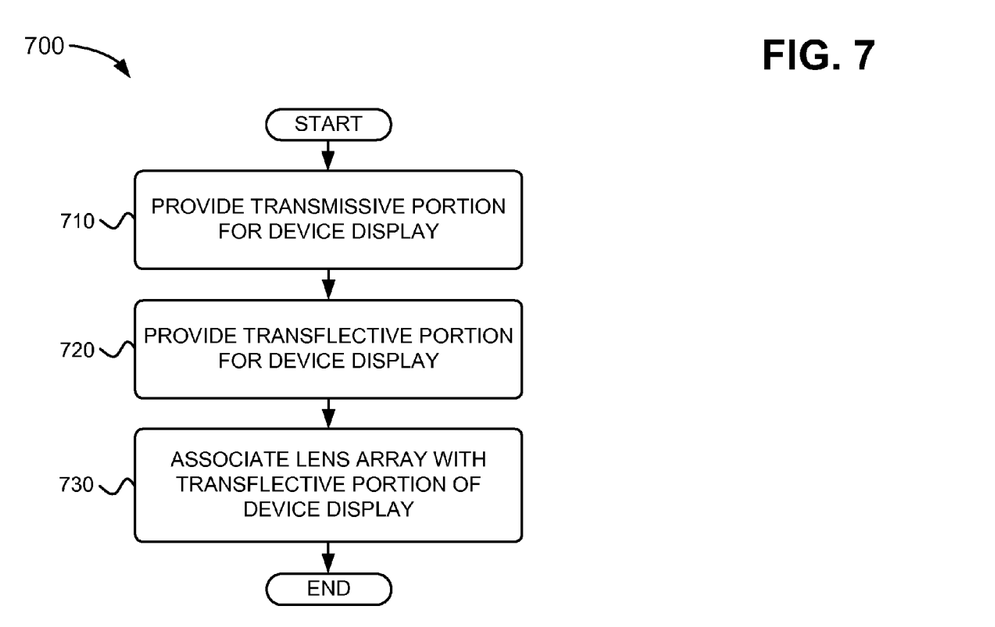
FIG. 7 is a flowchart of an exemplary process according to an exemplary implementation.

FIG. 7 is a flowchart of an exemplary process 700 according to an exemplary implementation. As shown, a process 700 may provide a transmissive portion for a device display (block 710). For example, in one implementation described above in connection with FIGS. 2A, 2B, 3A, and 3B, pixel array 210 of display 130 may include transmissive portion 240. Transmissive portion 240 may include any material that may be illuminated from the back by an illumination device (e.g., illumination device 200), and is viewed from the opposite side (i.e., the front).

Process 700 may provide a transflective portion for the device display (block 720). For example, in one implementation described above in connection with FIGS. 2A and 2B, pixel array 210 of display 130 may include transflective portion 230. Each pixel or subpixel of transflective portion 230 may include a transmissive section and a reflective section that permits transflective portion 230 to work as either a transmissive display or a reflective display, respectively. For example, transflective portion 230 may work reflectively when illumination device 200 is de-energized or turned off, and may work transmissively when illumination device 200 is energized or turned on. In another implementation described above in connection with FIGS. 3A and 3B, pixel array 210 of display 130 may include one or more transflective portions 310 and 320 of various shapes (e.g., square, rectangular, circular, triangular, etc.), sizes, and/or locations. Any number of transflective portions may be provided for pixel array 210, depending upon the desired information to be displayed by pixel array 210 when illumination device 200 is de-energized or turned off.

As further shown in FIG. 7, process 700 may associate a lens array with the transflective portion of the device display (block 730). For example, in one implementation described above in connection with FIG. 2A, lens array 220 may be associated with transflective portion 230. Lens array 220 may be made from a variety of materials (e.g., glass, quartz, sapphire, polymeric materials including plastics, etc.). Lens array 220 may be a variety of shapes and/or sizes (e.g., a micro lens array formed from any of the foregoing materials). If illumination device 200 is energized, lens array 220 may collect the light from illumination device 200 and guide it to the transmissive section of transflective portion 230. If illumination device 200 is de-energized, the reflective section of transflective portion 230 may reflect ambient light to display information during the standby mode. In another implementation described above in connection with FIG. 3B, transflective portion 310 may have a lens array 330 associated with it, and transflective portion 320 may have a lens array 340 associated with it. If illumination device 200 is energized, lens arrays 330 and 340 may collect the light from illumination device 200 and guide it to the transmissive sections of transflective portions 310 and 320. If illumination device 200 is de-energized, the reflective sections of transflective portions 310 and 320 may reflect ambient light to display information during the standby mode.

CONCLUSION

Implementations described herein may relate to a transmissive and transflective display for use in conjunction with a device. By using a transmissive/transflective display and a lens array associated with the transflective portion, the performance of the display may substantially match the performance of a pure transmissive display while still providing a reflective portion. The lens array may collect and guide the light from an illumination device to a transmissive section of the transflective portion when the illumination device is energized. Ambient light may reflect from a reflective section of the transflective portion when the illumination device is de-energized or turned off. This may enable the transflective portion of the display to display information when the device is in a standby mode (i.e., when the illumination device is turned off). In other implementations, the display may include several transflective portions (e.g., of varying shapes, sizes, locations, etc.) that may display various standby information (e.g., a clock, battery life, connection to a network, etc.), without consuming battery power with the illumination device.

The foregoing description of preferred embodiments provides illustration and description, but is not intended to be exhaustive or to limit the invention to the precise form disclosed. Modifications and variations are possible in light of the above teachings or may be acquired from practice of the invention.

For example, while series of acts have been described with regard to FIG. 7, the order of the acts may be modified in other implementations consistent with principles of the invention. Further, non-dependent acts may be performed in parallel.

It should be emphasized that the term "comprises/comprising" when used in the this specification is taken to specify the presence of stated features, integers, steps or components but does not preclude the presence or addition of one or more other features, integers, steps, components or groups thereof.

Embodiments, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   an illumination device to provide light; and
   a display comprising:
      a plurality of transmissive pixels to receive and transmit, to a user, the light provided by the illumination device, and
      a plurality of transflective pixels that differ from and are substantially co-planar with the plurality of transmissive pixels, where each of the plurality of transflective pixels includes:
         a transmissive section to receive and transmit, to the user, the light from the illumination device, and
         a reflective section to receive and transmit, to the user, ambient light,
   where the plurality of transmissive pixels and the transmissive sections, of the plurality of transflective pixels, are illuminated, by the illumination device, when the illumination device is activated, and
   where the plurality of transflective pixels are associated with a shape, and the ambient light illuminates the reflective sections, of the plurality of transflective pixels, and not the plurality of transmissive pixels, such that the shape is visible to the user when the illumination device is deactivated.

2. The device of claim 1, where the display comprises one of a monochrome or a color display.

3. The device of claim 1, where the display further comprises:
   a lens array to guide the light from the illumination device only to the transflective pixels and not to the plurality of transmissive pixels.

4. The device of claim 3, where the lens array is positioned between the illumination device and the plurality of transflective pixels.

5. The device of claim 3, where the lens array comprises at least one of glass, quartz, sapphire, or polymeric materials.

6. The device of claim 3, where the lens array comprises a micro lens array and is aligned with the plurality of transflective pixels and not with the plurality of transmissive pixels.

7. The device of claim 3, where the plurality of transmissive pixels does not receive the light from the illumination device via the lens array.

8. The device of claim 1, where the device comprises one or more of:
a radiotelephone,
a personal communications system (PCS) terminal,
a personal digital assistant (PDA),
a laptop,
a global positioning system (GPS) device,
a personal computer,
an MP3 player,
a printer,
a facsimile machine,
a pager,
a calculator, or
a camera.

9. A device display comprising:
an illumination device;
a pixel array that includes:
   a plurality of transmissive pixels to transmit light received from the illumination device, and
   a plurality of transflective pixels that differ from the plurality of transmissive pixels, where each of the plurality of transflective pixels includes:
     a transmissive section to transmit light received from the illumination device, and
     a reflective section to reflect ambient light,
   where the plurality of transmissive pixels and the transmissive sections, of the plurality of transflective pixels, are illuminated, by the illumination device, when the illumination device is activated, and
   where the plurality of transflective pixels are associated with a shape, and the ambient light illuminates the reflective sections of the plurality of transflective pixels, and not the plurality of transmissive pixels, such that the shape is visible when the illumination device is deactivated; and
a lens array associated with the plurality of transflective pixels, and not the plurality of transmissive pixels, of the pixel array, the lens array to guide the light received from the illumination device to the transmissive sections of the plurality of transflective pixels.

10. The device display of claim 9, where the pixel array comprises a liquid crystal display (LCD).

11. The device display of claim 9, where the pixel array comprises one of a passive-matrix structure or an active-matrix structure.

12. The device display of claim 9, where each of the plurality of transflective pixels comprises:
a first subpixel that includes a first reflective section and a first transmissive section;
a second subpixel that includes a second reflective section and a second transmissive section; and
a third subpixel that includes a third reflective section and a third transmissive section.

13. The device display of claim 12, where each of the plurality of transflective pixels further comprises:
a first thin film transistor (TFT) associated with the first subpixel;
a second TFT associated with the second subpixel; and
a third TFT associated with the third subpixel.

14. The device display of claim 13, where each of the plurality of transflective pixels is associated with a row line and at least one corresponding gate line via the first, second, and third TFTs.

15. The device display of claim 12, where the lens array comprises a plurality of lenslets, each lenslet being associated respectively, with one of the first subpixel, the second subpixel, or the third subpixel of the one of the plurality of transflective pixels.

16. The device display of claim 9, where the illumination device comprises one of:
an incandescent light bulb;
one or more light-emitting diodes (LEDs);
an electroluminescent panel (ELP);
one or more cold cathode fluorescent lamps (CCFL); or
one or more hot cathode fluorescent lamps (HCFL).

17. The device display of claim 9, where, when the illumination device is activated and illuminates the pixel array, each of the plurality of transmissive pixels and each of the plurality of transflective pixels provides substantially similar illumination, contrast, and color.

18. The device display of claim 9, where the device display is provided in a device that comprises one or more of:
a radiotelephone,
a personal communications system (PCS) terminal,
a personal digital assistant (PDA),
a laptop,
a global positioning system (GPS) device,
a personal computer,
an MP3 player,
a printer,
a facsimile machine,
a pager,
a calculator, or
a camera.

* * * * *

UNITED STATES PATENT AND TRADEMARK OFFICE
CERTIFICATE OF CORRECTION

| | | |
|---|---|---|
| PATENT NO. | : 8,243,237 B2 | Page 1 of 1 |
| APPLICATION NO. | : 11/557216 | |
| DATED | : August 14, 2012 | |
| INVENTOR(S) | : Martin Grip and Alexander Hunt | |

It is certified that error appears in the above-identified patent and that said Letters Patent is hereby corrected as shown below:

Title page, item (73) Assignee, change "(CH)" to "(SE)".

Signed and Sealed this
Second Day of October, 2012

David J. Kappos
*Director of the United States Patent and Trademark Office*